United States Patent
Caretta

[11] Patent Number: 6,062,284
[45] Date of Patent: May 16, 2000

[54] TWO-WHEELED-VEHICLE TIRES

[75] Inventor: Renato Caretta, Gallarate, Italy

[73] Assignee: Pirelli Coordinamento Pneumatici S.p.A., Milan, Italy

[21] Appl. No.: 08/711,269

[22] Filed: Sep. 6, 1996

Related U.S. Application Data

[62] Division of application No. 08/252,528, Jun. 1, 1994, Pat. No. 5,562,792, which is a continuation of application No. 07/714,871, Jun. 13, 1991, abandoned.

[30] Foreign Application Priority Data

Jun. 14, 1990 [IT] Italy ........................................ 20646/90

[51] Int. Cl.[7] ............................................. B60C 9/22

[52] U.S. Cl. ........................ 152/527; 152/530; 152/533

[58] Field of Search ........................... 152/527, 530, 152/531, 533, 451; 156/117

[56] References Cited

U.S. PATENT DOCUMENTS

| | | | |
|---|---|---|---|
| 4,169,495 | 10/1979 | Maiocchi | 152/527 |
| 4,773,462 | 9/1988 | Ohkuni et al. | 152/530 |
| 5,048,280 | 9/1991 | Okamoto et al. | 57/238 |

FOREIGN PATENT DOCUMENTS

| | | | |
|---|---|---|---|
| 335588 | 10/1989 | European Pat. Off. | 152/531 |
| 1487426 | 9/1977 | United Kingdom | 156/117 |

*Primary Examiner*—Geoffrey L. Knable
*Attorney, Agent, or Firm*—Stevens, Davis, Miller & Mosher, L.L.P.

[57] ABSTRACT

A process for the manufacture of tire for high speed two-wheeled vehicles comprising making a cylindrical sleeve, attaching annular bead wires to the axial ends of said sleeve and shaping the sleeve into a toroidal configuration. A belt structure made of coils of cords is applied to the crown of said toroidal configuration. The belt is reinforced with HE cords which can be deformed to enable the tire carcass to be so largely expanded into the mold to achieve completely molding of a tread band.

19 Claims, 3 Drawing Sheets

TWO-WHEELED-VEHICLE TIRES

This is a Divisional of application Ser. No. 08/252,528 filed Jun. 1, 1994 now U.S. Pat. No. 5,562,792, which in turn is a continuation of application Ser. No. 07/714,871 filed Jun. 13, 1991 now abandoned.

BACKGROUND OF THE INVENTION

The present invention is concerned with a process for the manufacture of motor-driven vehicle tires, in particular for two-wheeled vehicles and more particularly for motorcycles, and the tires made by the process.

These tires have a particular structure and shape so that they can withstand use conditions completely different from those in which normal tires for four-wheel vehicles are used; it is in fact sufficient to remember that when curvilinear paths have to be taken it is not the travel direction of the tire which is altered but the vehicle position, which is inclined sideways towards the road surface during a turn.

For the above reason two-wheeled-vehicle tires must be capable of running with camper angles of very high value, in the order of 50° or more, against a normal value of 3° to 4° in four-wheeled-vehicle tires, the camber angle being continuously and uniformly altered: consequently these tires have a cross section which is very rounded, that is provided with a strong convexity in the crown, unlike other tires in which the transverse profile of the tread is almost flat.

This strong convexity in the crown involves problems during the tire molding step bringing about drawbacks and deterioration of quality in use.

THE PRIOR ART

It is known that a tire of the above type comprises a carcass of toroidal form, a tread band disposed on the crown of said carcass and an annular reinforcement structure, also know as belt, fitted between the carcass and the tread band.

In particular, in carcasses of the radial type, that is those having reinforcement cords lying in planes containing the rotational axis of the tire, the belt preferably comprises one or more layers of cords made of an appropriate reinforcement material, at least resistant to tensile stress, disposed in mutual side by side relation and all parallel to one another and oriented in a substantially circumferential direction.

This annular reinforcement structure must be circumferentially inextensible and be submitted to a tensile preloading when the tire is deflated, so that it can perform all the required functions when the tire is in use.

It is also know that a process for the manufacture of such radial tires substantially comprises the stops of disposing the carcass in the form of a cylindrical sleeve on an appropriate manufacturing drum; giving said carcass a toroidal form on the selfsame drum or on a different manufacturing drum; applying an annular reinforcement structure and the tread band to the crown of the toroidal carcass thus shaped; putting the carcass thus arranged within a vulcanization mold of the type commonly referred to as "centripetal" which, in register with the tread, is provided with a ring of sectors radially movable inwardly and outwardly; expanding the carcass for the purpose of putting said belt in a preloaded condition and simultaneously closing the mold by a centripetal radial displacement of the sectors, so that a raised pattern formed by said sectors may penetrate into the tread band while carrying out the molding thereof.

The expansion of the carcass within the mold is usually know as "pulling" and corresponds to an increase of about 1.5% in the circumferential size of the tire. This process, in tires of the type having a high transverse convexity to which the present invention refers, gives rise to some drawbacks which are particularly troublesome in tires in which the tread pattern has very deep hollows or grooves.

In fact, as previously stated, the belt must be an almost inextensible circumferential structure, which means that the maximum permissible pulling cannot exceed the above stated value corresponding to a similar percent increase in the diameter thereof.

If the maximum depth of the hollows in the tread pattern is higher than this value it is apparent that the overall pattern molding can only be achieved by making the ribs present on the mold sectors penetrate into the thickness of the tread band and therefore the deeper the rib penetration is, the greater the portion of hollow formed in this manner.

It is however to be noted that while the expansion of the carcass is substantially radial at any point, and therefore the hollow portions formed as a result of the movement of the tread band against the sector ribs have a certain radial height, on the contrary the movement of each sector against the tread band is radial only at its axis of symmetry, whereas all other points move in a direction parallel to said axis and therefore not at right angles to the profile of the tire carcass, thereby molding hollows that are offset and displaced with respect to the desired pattern.

The phenomenon is increasingly more serious at the sector ribs which are more spaced apart from the axis of symmetry and for tires having a stronger convexity, particularly in the transverse direction.

In order to solve this problem the expansibility of the belt should be increased so as to increase the depth percent of the hollow formed by the movement of the tread band against the mold sectors (at the most as far as the value of 100%), but this would require a belt having a very expansible circumference which is contrary to the requirements of the tire in use.

The manufacture of a belt which is extensible only during the molding step by the use of the presently adopted cords made of high-resistant materials such as Kovlar (registered trademark available for Du Pont) or steel, but laid down loosely, that is in an undulated manner, or in compression, is not feasible due to the difficulties arising in connection with the process; actually the number of problems created by such a working process is greater than that of the problems thus solved.

Neither does the use of very extensible and heat-shrinkable textile materials such as nylon enable the problem to be solved, since these materials are unable to withstand stresses arising during the use of the tire without undergoing important deformations, in particular due to the effects of centrifugal force connected with high speed of the vehicle, which can even reach values in the order of 300 kilometers per hour.

SUMMARY OF THE INVENTION

The applicant has now devised a new process for the manufacture of tires of the type discussed above, and in particular a process for carcass shaping and belt manufacture enabling all the above problems to be solved and still other problems that will be disclosed hereinafter, so that the object of the present invention is a process for the manufacture of tires for motor-cycles capable of offering high performances, and the tires thus obtained that are in particular free from structural and molding faults that could adversely affect their behavior in use.

One aspect of the invention is to provide a process for the manufacture of tires for vehicle wheels comprising the following steps;

manufacturing a tire carcass in the form of a cylindrical sleeve, by producing a tubular element of rubberized fabric reinforced with cords disposed substantially parallel to the axis of said sleeve and folding back the ends of the cords of said tubular element about one of a pair of annular metal bead cores which are circumferentially inextensible, said bead cores lying in planes perpendicular to the sleeve axis;

shaping said tubular element into a torus by radially expanding the sleeve wall and moving said bead cores close to each other in an axial direction, so that a first toroidal configuration is formed;

assembling a belt structure to the crown of said torically-shaped carcass, which belt structure comprises cords oriented in a substantially circumferential direction disposed in mutual side by side parallel relation, and superposing a tread band on said belt at a radially outer position thereof;

introducing the assembled tire into a vulcanization mold;

closing said mold and expanding the carcass against the mold surface, so that it reaches its final toroidal configuration, so as to achieve the molding of the tread pattern into the tread band in particular; and     vulcanizing said carcass, the process being characterized by the fact of:

making said belt using cords of a high-elongation type exhibiting, in their load-elongation diagram, a curvilinear portion mutually connecting two substantially rectilinear lengths to each other, which lengths are of different inclination relative to the axes of said diagram, and         moving said annular bead cores coaxially close to each other during the toroidal shaping of said tubular element until a mutual axial distance is reached which corresponds to an intermediate toroidal configuration of smaller diameter than that of said first toroidal conformation, and exhibits a deviation of predetermined value from said final toroidal conformation, the value of the center axial distance between said annular bead cores being given by the load-elongation diagram of said belt cords, so that the expansion of said carcass in said mold to the final toroidal configuration, puts said belt cords in a tensile condition (preloading) corresponding to a point of said diagram located within said curvilinear portion.

Preferably said point will be located close to the end of said curvilinear portion corresponding to the highest elongation value.

In a very convenient manner, said cords are metal cords oriented in the same way and exhibiting an ultimate elongation included between 4% and 8% and which have been previously rubberized.

Conveniently said belt structure can be mad by wrapping one or more turns of one or more strips of sufficient width around said carcass, which strips are formed with rubberized fabric reinforced with said high-elongation cords, overlapping the ends of said strip or strips over a portion in the order of 20 mm to 50 mm, or wrapping a single high-elongation cord continuously and repeatedly around said carcass going on in an axial direction from one end of the carcass to the other.

A different way for making said belt comprises holicoidally wrapping or coiling a tape of rubberized fabric of two or more (usually ten at the most) high-elongation cords on said carcass, proceeding in an axial direction from one end to the other along the toroidal profile of the carcass. In addition, should the above coiling techniques be used, the helical wrapping can also be carried out by simultaneously proceeding from the middle towards both ends of the carcass, or the other way round.

In keeping with a further aspect of the invention, a tire for two-wheeled vehicles is provided which comprises a carcass of toroidal form having a strong transverse convexity, having a crown portion and two sidewalls terminating in beads for anchoring to a corresponding mounting rim, a tread band located on the crown of said carcass and having a convexity ratio in the range of 0.15 to 0.45, and a circumferentially inextensible belt structure interposed between said carcass and tread band, said annular reinforcement structure comprising a plurality of cord coils disposed in axial side by side relation, extending from one end of said structure to the other according to an angle almost of zero value relative to the circumferential direction of the tire characterized in that said reinforcement cords are of the high-elongation type having a load-elongation diagram with a curvilinear portion connecting two substantially rectilinear lengths to each other, said lengths having a different inclination relative to the axes of said diagram, said cords in a vulcanized but not inflated and not loaded tire being in a tensile condition (preloading) corresponding to a point of said diagram located within said curvilinear portion and preferably in the vicinity of the end thereof corresponding to the greatest elongation value.

In a preferred embodiment, said reinforcement cords are metal cords oriented in the same way and having an ultimate elongation in the range of 4% to 8%.

The density of said cords in the above tire is preferable between 25 to 150 wires/dm and said cords can also be unevenly distributed in an axial direction, having concentrations and thinnings along said axial extension.

In addition, said high-elongation cords, if metallic, preferably consist of 1 to 4 strands, each strand in turn preferably consisting of 1 to 7 elementary wires, of a diameter in the range of 0.10 mm to 0.25 mm and the strands being helicoidally twisted together in the same way, their stranding pitch being between 10 mm, and 200 mm.

Advantageously the tire of the invention shows a substantially balanced and uniform behavior, characterized by the fact that the difference between the values of the drift thrust measured on the tire during rotation either clockwise or counterclockwise is less than 15% of the value of the maximum drift thrust.

BRIEF DESCRIPTION OF THE DRAWINGS

The present invention will be best understood from the following detailed description and the accompanying drawings, given hereinafter by way of non-limiting example, in which.

DESCRIPTION OF A PREFERRED EMBODIMENT

Figure 1:
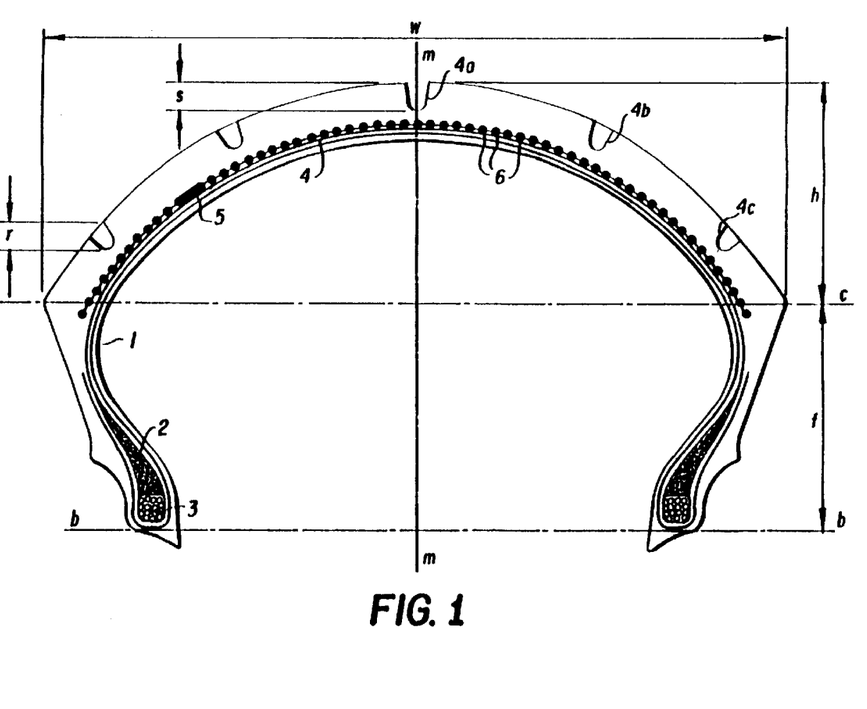
FIG. 1 is an axial cross section of the tire of the invention.

Illustrating the tire of the invention first and referring particularly to FIG. 1, the tire comprises a carcass 1 formed with one or more rubberized fabric plies, having a toroidal conformation in right section in which the ends of the cords of the plies are folded back from the axial inside to the axial outside in a known manner around annular metal bead cores 3, provided, at an outer radial position, with a filler 2 of elastomeric material having appropriate rheometric features.

The crown of said carcass has a tread band 4 and an intermediate structure 5, usually known as a breaker or a belt, interposed between the tread band and the carcass.

The tire area comprising the bead core 3 and filler 2 constitutes the tire bead, for ensuring the anchoring of said tire to a corresponding mounting rim, not shown.

The area substantially included between the radially outer end of the filler 2 and the belt 5 end is referred to as a tire sidewall and constitutes the area of maximum flexibility, adapted to ensure comfort during the vehicle ride.

On the other hand, in some very particular embodiments the radial length of the sidewall area can be greatly reduced and in effect the sidewall can be eliminated when the radially outermost area of the filler 2 comes into contact with the radially inner end portion of the tread.

As can be seen from the tire shown in FIG. 1, though only examined from a qualitative point of view, motor-cycle tires have a very encircling tread, having a marked convexity in crown and, in effect, have a very rounded shoulder or could be considered not to have a shoulder between the sidewall and the tread band.

In particular this convexity is expressed by the value of the h/w ratio, where h represents the radial height of the tread relative to the reference line c—c passing through the radially inner ends of said tread, and w represents the maximum width of said tread, as shown in FIG. 1. For the tire of this invention the h/w value is preferably in the range of 0.15 to 0.45.

The exact defining of the tread ends, necessary for a reliable and objective definition of the values of h and w, can be easily achieved due to the fact that the tread edge is in register with the maximum width of the tire and often ends in a sharp edge distinguishing the beginning of the sidewall and above all is adapted to enable the vehicle driver to appreciate when the maximum permissible camber angle is achieved, during a curvilinear ride path or on a curve in the road.

The radial height f of this edge or of the tread edge relative to a base line (b—b) of the beads, taken as reference line, conveniently although not necessarily is coincident with the ends of belt 5. The base line b—b connects the bead seating area of the two tire beads.

Formed in the thickness of the tread band is a raised pattern consisting of a plurality of hollows or grooves 4a, 4b, 4c and lands (not shown) obtained in a known manner by a molding operation carried out on the raw carcass in an appropriate mold.

The reasons for which in case of radial tires the mold must be of the type provided with radially movable sectors, the so-called centripetal type, have already been discussed.

For an appropriate behavior of the tire on the road, the direction of the grooves in relation to the thickness of the tread band must be substantially perpendicular to the tread surface at that point. It will be therefore recognized, and as can be seen from FIG. 1, that grooves of the same radial depth a actually have different developments into the tread, in a direction parallel to the equatorial plane m—m, depending upon the lying position of the groove in the tread, this developments is equal to s for grooves located in the equatorial plane itself and proportionally decreases to a minimum value r for the grooves located at end (axial outer) positions.

On the contrary, when progressively moving axially from the middle towards the tread edges the width of said grooves in the axial direction increases.

It is therefore apparent, also from FIG. 1, that a correct molding of the axial outer end grooves of the tread cannot be achieved by a mold portion (sector) which is moved as a unit in a radial direction parallel to the line m—m, although provided with ribs that exactly correspond to the grooves 4b and 4c.

As regards the carcass, the reinforcement cords 11 (FIG. 4) of the corresponding plies are of any convenient know material, even a metallic but preferably a textile material, and in this case more specifically of a material having a low modulus: among these materials the most appropriate for use are rayon, synthetic polyester fibers, and synthetic aliphatic poliamide fibers, generally known as nylon.

For example, in the illustrated embodiment the cords are made of rayon, that is a synthetic fiber made from cellulose, extend axially from one bead to the other and are disposed at right angles to the circumferential direction of the tire, shown by the line m—m of the equatorial plane (center line), that is inclined to said line by an angle substantially equal to 90°.

Considering now the belt structure 5, it is formed with a plurality of cords 6 formed as coils disposed in axial side by side relation and extending from one axial end of the carcass crown portion to the other.

In a preferred embodiment of the invention said cords are metal cords oriented in the same way, of the high-elongation type, generally known as "HE cords", each consisting of a certain number, 1 to 5 and preferably 3 to 4, strands, each strand being comprised of a give number, 2 to 10 and preferably 4 to 7, of elementary wires having a diameter greater than 0.10 mm, preferably ranging between 0.12 and 0.25 mm. The strand wires and the cord stands are helically twisted together in the same way, according to the same twisting pitch or also according to different pitches for the wires and the strands (so called Lang's lay).

Obviously materials other than metal could also be used, provided that the cords have the same type of load-elongation diagram as above stated and mechanical strength features adapted to withstand the forces acting on the tire.

In particular the cord used in the prototype tire herein specifically described is a metal cord technically known as 3×7×0.12HE, that is a cord consisting of three strands, each of seven steel wires of 0.12 mm of diameter.

Figure 2:
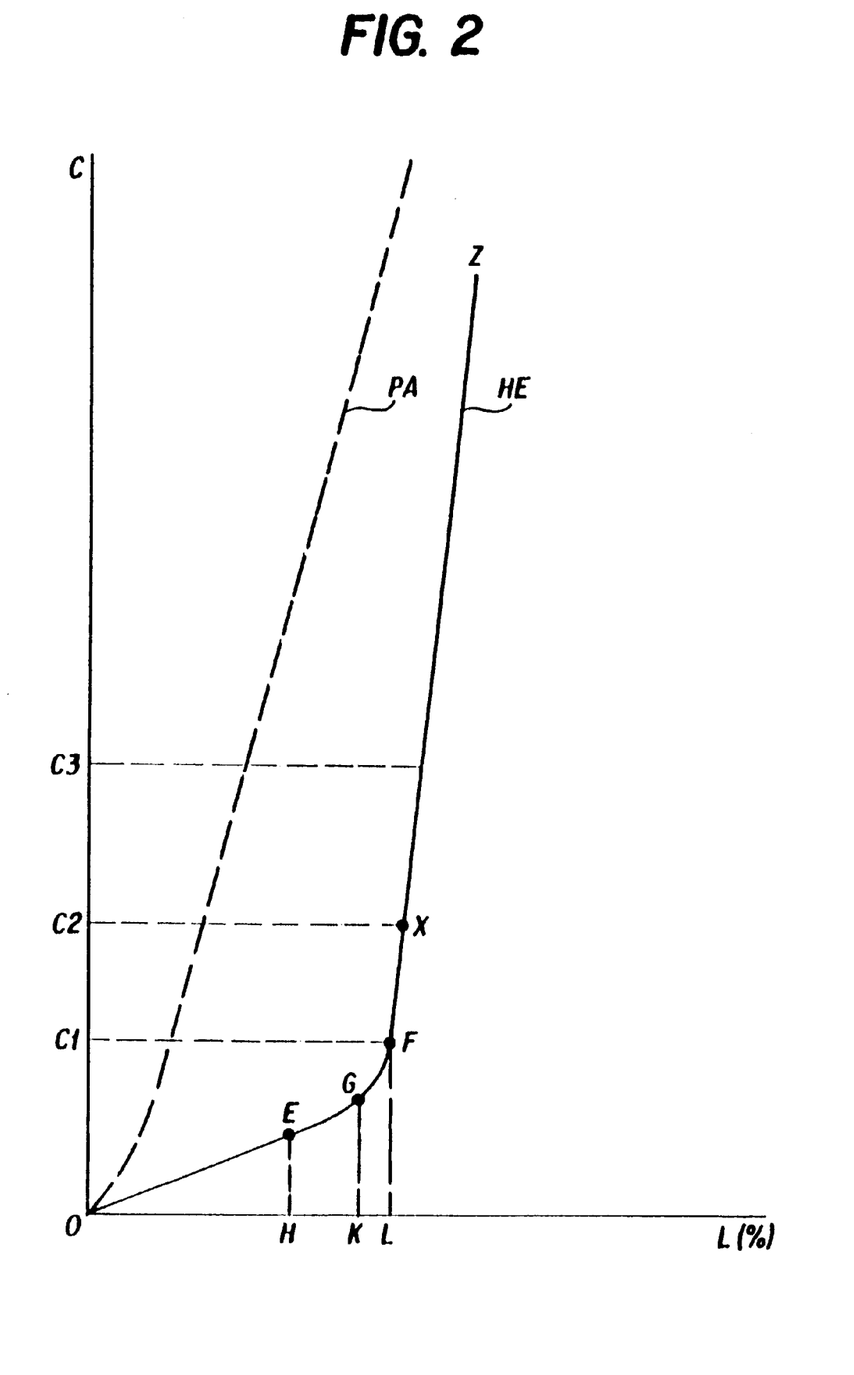
FIG. 2 is a qualitative and non-quantitative load-elongation diagram of the cords in accordance with the invention as compared with that of a cord type widely used in the present tires.

Due to the fact that the wire and strand twisting is carried out in the same way, the finished cord is coiled and substantially acquires the features of a spring and its particular load-elongation diagram shown in FIG. 2 by line HE depends on this fact.

In FIG. 2 there is a pair of reference axes perpendicular to each other with the load values C, that is the values of the tensile stresses applied to the cord, reproduced on the vertical axis, whereas on the horizontal axis the percent cord-elongation values L are reproduced. After submitting the cord to increasing tensile values, the corresponding elongations are measured and then marked in the plane defined by said pair of axes at points corresponding to each pair of applied load/achieved elongation values until the breaking point of the cord is reached.

One can immediately see that said diagram includes one substantially rectilinear length (OE) of weak sloping (strong elongations at low loads) followed by a still substantially rectilinear length (FZ) of strong sloping (small elongations at increasingly stronger loads), the two lengths being connected to each other by a curvilinear portion (EF) usually referred to as a "knee".

By way of example, one can ascertain that the center line of said curvilinear portion EF corresponds to an elongation value ranging between about 1.5% and 3%; thus the explanation of the diagram can be easily understood.

The length of weak sloping corresponds to the elongation of the above described "spring"; in other words, during starting the elongation, first diagram portion, the helical coils of the cord extend, which brings about the wire straightening, as they exhibit a low tensile strength.

Going on in pulling, at the end of the knee the wires have already been completely extended, though twisted upon themselves and therefore they react to the applied pulling force by effect of the mechanical features of the material and no more by effect of the geometrical configuration of the cord. The material used is steel and consequently the cord elongation becomes moderate in spite of the increase in the applied force.

On the contrary, the cords normally used exhibit a load-elongation diagram as represented in FIG. 2 by line PA: in this case one can see the almost constant behavior of the cord submitted to pulling stresses, also characterized by a lower sloping than in the cord HE; the importance of this fact will be apparent in the following.

It will be now understood how the use of said cord has enabled the problem of the invention to be generally solved. The cord is in fact coiled on the carcass shaped according to an intermediate toroidal configuration, still far from the final toroidal configuration that it will take in the mold, under a rather weak tension in order not to deform the carcass structure.

In this manner the cord, with reference to its load-elongation diagram, is still in the vicinity of point 0, in the starting length OE of weak sloping.

The belt is therefore substantially extensible at low values of the applied load, so that the following carcass expansion in the mold (obtained with load C1) can conveniently take high values in order to enable the molding of the tread band, and in particular of the pattern grooves through the complete depth thereof, by the displacement of the band against the projections of the sectors in the already closed mold, thereby ensuring a strictly radial molding at all points, whereas the belt cord or cords are brought to work to a point of the load-elongation diagram included in said curvilinear portion and preferably close to the outlet F from the knee and therefore already in a state of considerable tension (preloading) and in any case at the beginning of the length of maximum tensile strength.

The vulcanization of the tire makes this situation stable so that, during the use of the tire (strong increase of the permanent load (C2–C1) by effect of the inflation pressure, and strong variable acting loads (C3–C2) by effect of speed) the belt works in the cord diagram portion external to point X.

It will be immediately noted that in this portion of the diagram the cords of the invention react with a lower elongation than the know cords, the load increase (C3–C2) being equal, that is the belt really behaves like a structure substantially inextensible in a circumferential direction, which ultimately brings about a better behavior of the tire of the invention, above all at high and very high speeds, as compared with the behavior of traditional tires.

Knowing this general behavior, it is possible to examine the process of the invention in more detail.

It is known that the process for the manufacture of tires usually provides the following already mentioned and well-know steps:

manufacturing the tire carcass in the form of a cylindrical sleeve, by producing a tubular element of rubberized fabric reinforced with cords disposed substantially to the axis of said sleeve and folding back the ends of the cords of said tubular element each about at least an annular metal bead core which is circumferentially inextensible, said bead cores lying in planes perpendicular to the sleeve axis;

toroidally shaping said tubular element by radially expanding the sleeve wall centrally of the tow bead cores and moving the bead cores close to each other in an axial direction, so that a first toroidal configuration is achieved;

assembling a belt structure to said toroidally-shaped carcass, which belt structure comprises coils of cords oriented in a substantially circumferential direction and disposed in side by side relation, and a tread band on said belt at a radially outer position thereof;

introducing the full carcass into a vulcanization mold of the centripetal type;

closing said mold and expanding the carcass against the mold surface, so as to achieve the molding of the tread band in particular, and finally vulcanizing said carcass by an appropriate heat treatment to high temperature and pressure.

In accordance with the invention the above process is modified so as to accomplish a new process characterized by the fact of;

making said belt using cords of the high-elongation type exhibiting, in their load-elongation diagram, (see FIG. 2) a curvilinear portion mutually connecting two substantially rectilinear lengths of different sloping, and moving said annular bead cores coaxially in relation to each other during the toroidal shaping of said tubular element until a mutual axial distance between the cores is reached which corresponds to an intermediate toroidal configuration of smaller diameter than that of said first toroidal configuration and exhibits a deviation of predetermined value from said final toroidal conformation, the value of the center distance between said annular cores being given by the load-elongation diagram of said belt cords, so that the expansion of said carcass in said mold into the final toroidal configuration, puts said belt cords in a tensile condition (preloading) corresponding to a point of said diagram located within said curvilinear portion.

Figure 3:
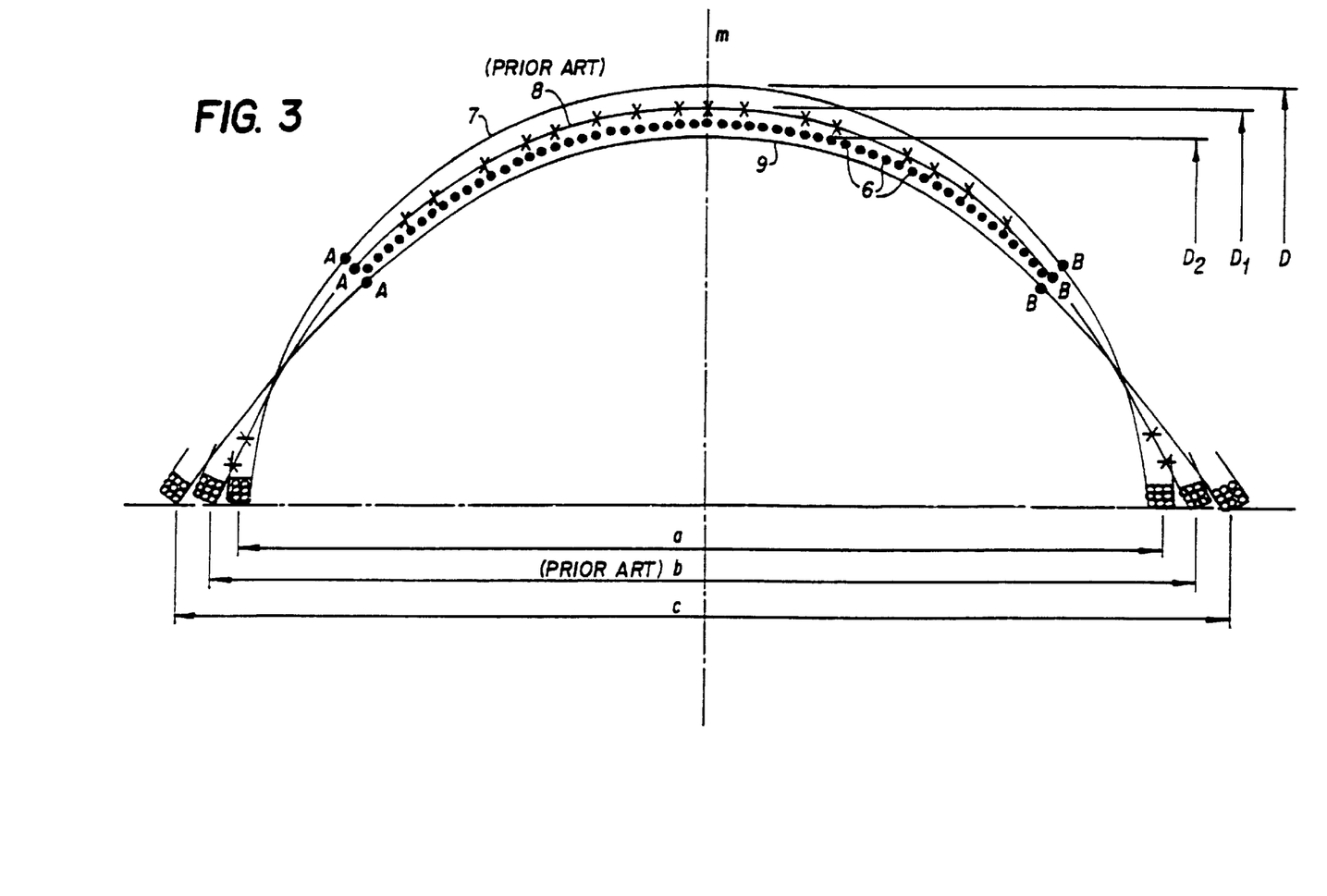
FIG. 3 is a diagrammatic axial cross section showing the profile of toroidal conformation of a tire carcass in accordance with the invention in three different situations.

Shown schematically in FIG. 3 are three different profiles (7, 8, 9) of toroidal conformation of the selfsame carcass, profile 7 representing the final conformation profile of the carcass plies in the vulcanization mold after the molding has taken place and during the vulcanization cycle. On all of the three profiles points A and B indicate the ends of the crown portion on which the belt structure is placed. It is obvious that the profiles must have the same linear extension from one bead to the other.

Profile 8 represents the first toroidal conformation profile of the carcass, before applying the belt in accordance with the known art; the difference D-d1 corresponds to the usual expansion at the equatorial plane undergone by the carcass and the belt during the pulling step which, as seen, is equal to about 1.5%.

Profile 9 on the contrary represents the toroidal intermediate conformation profile of the selfsame carcass according to the process of the invention, that is that of the carcass ready to be assembled to the belt formed with high-elongation cords.

The diameter of profile 9 has a value d2 lower than d1 so that the increase D-d2 corresponding to the expansion of the carcass during the pulling step corresponds to the elongation undergone by the belt cords.

Said intermediate toroidal conformation profile 9 of the carcass can be adjusted so that it may have a lower diameter than the profile 8 by stopping the axial movement of the beads close to each other at a convenient value c that is greater than b.

In this manner the expansion of the carcass as far as the profile 7 is achieved, is permitted by the fact that the mutrual distance between the beads, commonly know as "posting" simultaneously passes from value c to the lower value; in this manner it is in fact possible to achieve an increase in the carcass diameter simultaneously with a constant linear extension of the toroidal profile of the carcass itself.

Ideally the difference D-d2 must correspond to the maximum depth s of the grooves in the tread pattern.

The elongation undergone by the belt cord or cords must be suitable to put said cords to a general point G (see FIG. 2) within the portion EF and preferably even to point F of the load-elongation diagram; in other words, G can vary at the inside of the knee but it will be preferably moved as much as possible towards the knee outlet or even to the boundary thereof, that is at the beginning of the greatly sloping portion.

The importance of the characteristic proper to the process for the manufacture of tires in accordance with the invention is now readily apparent and it consists in fixing the diameter of the toroidal conformation profile of the carcass depending upon the desired pulling value (in turn depending on the depth of the grooves in the tread pattern and/or the starting elongation of the cords used for the belt structure) and to control said diameter value by the selection of a corresponding value c for the bead posting.

The correlation between the pulling amount and the groove depth is well apparent; on the contrary as regards the high elongation cords it is to be noted that the starting capability of elongation of said cords (first diagram length) depends on many factors, among which the stranding pitch of the wires and strands, so that different cords have different capability of starting elongation. Which means that, the desired condition for the cord at the end of the vulcanization step being fixed as that of point F and all other conditions being equal, the portion OF will exhibit a variable length depending on the variation of the cord features.

In other words, different starting elongations (OL) must be allocated to the different types of cords so that they may reach the fixed condition of point F and therefore also the pulling to be given to the carcass before its vulcanization must be of different amount.

It is to be noted that this pulling does not necessarily need to be given within the mold but part of it could be given on the conformation drum after the belt has been assembled to the carcass.

It is instead important that the degree of pulling given within the mold should not be lower than the maximum depth of the grooves in the tread pattern, which depth is also variable depending upon the type of tire and pattern.

It will be therefore clear how the use of said high-elongation cords in the belt enables the desired value to be given to the belt pulling whereas the manufacturing process in accordance with the invention enables the pulling to be given to the belt, to be adjusted in accordance with the precise features of the cord really used.

The manufacturing process being now known in its fundamental aspects, different embodiments are possible for the manufacture of the belt structure on the toroidally conformed carcass, all of them falling within the scope of the present invention.

According to a preferred embodiment the belt is made by helically wrapping continuously and repeatedly around the circumference of the tire a single optionally rubberized cord into coils disposed in side by side relation, proceeding axially from one end to the other of the crown portion of said carcass.

The wrapping pitch can be greater than the cord diameter so as to suitably control the density of the coils in the belt structure.

In this manner the angle at which the coils lie will not be strictly circumferential with respect to the tire but the coils will be oriented according to angles v (FIG. 4) different from 0° relative to the equatorial plane.

Figure 4:
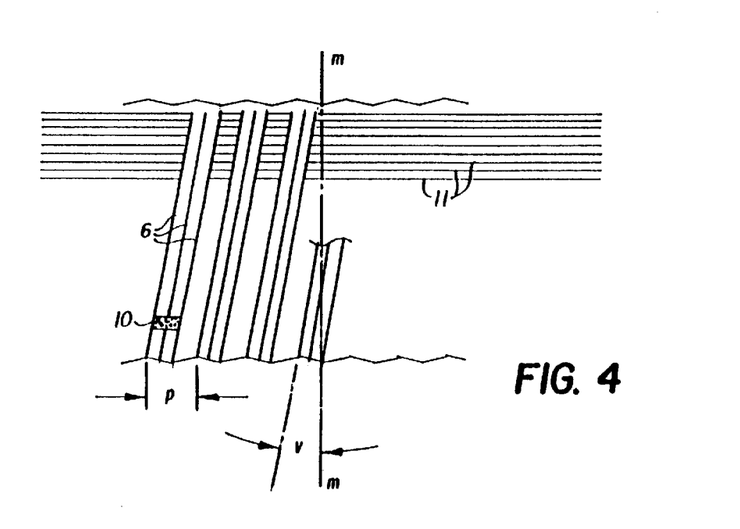
FIG. 4 is a plan vie of a portion of the belt structure of the tire shown in FIG. 1, in accordance with a specific embodiment.

However the value of said angle will always be lower than 2° and within this range, for high values of v, it could be convenient to modify also the lying angle of the cords 11 of the carcass plies (relative to the fundamental value of 90°) so as to maintain the correct cross angle between the carcass cords and the belt cords.

Preferably the coil density thus determined will be in the range of 25 to 150 cords/dm.

Alternatively, instead of helically wrapping a continuous single cord, a narrow tape containing several cords but preferably no more than 5 cords, could be conveniently wrapped around the carcass; in this manner the distance between the tape cords remains constant so that a possible variation in the tape coiling pitch p will bring about an uneven distribution of the coils in the belt structure thereby causing areas with closer coils followed by areas with less dense coils.

FIG. 4 shows an example of this belt embodiment, obtained by helically wrapping in an axial direction a tape 10 of rubberized fabric provided with three HE cords 6 coiled according to a pitch corresponding to five times the diameter of said cords.

In all cases of helical laying of the belt cords (either single cord or tape), the coiling can be conveniently carried out also starting from the middle of the crown portion, at the equatorial plane, and going on simultaneously in an axial direction towards both ends of said crown portion, or the other way about.

Advantage of the Invention

Many advantages are achieved with the tire of the present invention.

First of all the fact that a pulling greater than the usual one can be given to the raw carcass within the mold enables a perfect tire molding, in particular as far as the deepest grooves of the tread pattern are concerned, whereas this capability of greater expansion of the belt on the raw carcass is completely eliminated on the vulcanized tire and therefore does not create disadvantages as regards the tire behavior in use.

In addition to the foregoing, due to the fact that the tread molding no longer takes place by penetration of the projections present on the sectors into the tread band thickness, it is not compulsory to use molds of the centripetal type, and therefore simpler molds consisting of two halves can be used.

In addition, the capability of greater expansion of the raw carcass improves the quality level of the finished tire since it enables possible unevenness in the structure and size of the used semi-finished products to be compensated for, in particular as regards the tread band thickness: it is in fact known that when the molding mainly takes place by penetration of the projections disposed on the sectors into the tread band thickness even light deviations of the band thickness from the predetermined values give rise to important irregularities in the distribution of the elastomeric material and considerable deformations in the underlying belt and carcass structure.

The process of the invention, by distributing this unevenness over the whole circumferential and transverse extension of the carcass by effect of said capability of greater expansion, produces a leveling of the imperfections, a greater uniformity in the structure being recovered and therefore accomplishing an increase in the quality level of the finished tire.

As regards the belt, only the laying of the cord layer at 0° has been described, but obviously it is understood that other cord layers or strips can exist together with this layer, which layers may be inclined to the equatorial plane and/or disposed circumferentially, according to the known art.

The important advantages achieved with the tire of the invention, in particular as regards the structural evenness and regular distribution of the rotating masses, are confirmed by the fact that the difference between the drift thrust values measured in the two rotational directions of the tire, is lower than 15% of the maximum detected thrust value.

It is obviously understood that the above description is to be considered as exemplary of, but not specifically limiting the present invention and therefore all modifications and variations that, though not illustrated, can be easily deduced from the present inventive idea by a person skilled in the art are to be considered within the scope of the invention itself.

I claim:

1. In a tire for two-wheeled vehicles comprising
   a carcass of toroidal from having a strong transverse convexity, having one crown portion and two sidewalls terminating in beads for anchoring to a corresponding mounting rim, the carcass comprising one or more rubberized fabric plies,
   a tread band located on said crown and having a convexity ratio in the range of 0.15 to 0.45, and
   an annular, circumferentially inextensible reinforcement belt structure interposed between said carcass and tread band, said annular reinforcement belt structure comprising at least one reinforcement metal cord comprising a plurality of cord coils, oriented in substantially circumferential direction, and disposed in axial side-by-side relation and extending from one axial end of said structure to the other at an angle almost of zero value relative to the equatorial plane of the tire, wherein the only reinforcement layer between the tread band and the carcass is said annular reinforcement belt structure and all cord reinforcement of said belt structure is said cord coils which are at an angle almost of zero value relative to the equatorial plane of the tire,
   said at least one metal reinforcement cord being of a high-elongation, lang-lay type having a load-elongation diagram with a curvilinear knee-shaped portion which mutually connects two substantially rectilinear lengths of different inclinations relative to the axes of said diagram, said curvilinear knee-shaped portion having a center line ranging between an elongation value of 1.5% to 3%, wherein every said cord of said reinforcement belt structure in a vulcanized but not inflated and not loaded tire being in a tensile preloading condition corresponding to a point of said diagram located within said curvilinear knee-shaped portion.

2. A tire according to claim 1, wherein said metal cord have an ultimate elongation in the range of 4% to 8%.

3. A tire according to claim 2, in which said at least one metal reinforcement cord is formed with 2 to 4 strands, each strand in turn preferably comprising 2 to 7 elementary wires, of a diameter in the range of 0.1 to 0.50 mm.

4. A tire according to claim 1, in which said reinforcement cord coils are disposed at a density of between 25 to 150 coils/dm.

5. A tire according to claim 1, in which said reinforcement cord coils are axially distributed in said belt structure in an uneven manner.

6. A tire according to claim 1, wherein the tread band defines grooves and all the grooves are equally perpendicular relative to the tread band surface.

7. A tire according to claim 1, wherein the cords in the vulcanized but not inflated and not loaded tire are in the tensile preloading condition corresponding to a point of said diagram in a vicinity of an outlet (F) of said knee-shaped portion corresponding to a point of the knee of greatest elongation value.

8. A tire according to claim 1, wherein the cord consists essentially of metal filaments.

9. A tire according to claim 1, where said cords consist essentially of filaments made of steel.

10. A tire according to claim 1, wherein said angle ranges from greater than 0° to less than 2°.

11. A tire according to claim 1, wherein the at least one cord comprises a tape which contains a plurality of cords.

12. A tire according to claim 11, wherein the annular reinforcement structure consists essentially of said plurality of cords.

13. A tire according to claim 1, wherein the annular reinforcement structure consists essentially of one reinforcement metal cord, wherein said one reinforcement cord is optionally rubberized.

14. A tire according to claim 1, wherein the annular reinforcement structure consists of one reinforcement metal cord, wherein said one reinforcement cord is optionally rubberized.

15. A tire according to claim 1, wherein adjacent side-by-side cord coils are of the same cord.

16. In a tire for two-wheeled vehicles comprising
    a carcass of toroidal form having a strong transverse convexity, having one crown portion and two sidewalls terminating in beads for anchoring to a corresponding mount rim, the carcass comprising one or more rubberized fabric plies,
    a tread band located on said crown and having a convexity ratio in the range of 0.15 to 0.45, and one annular, circumferentially inextensible reinforcement belt structure interposed between said carcass and tread band, said annular reinforcement structure comprising at least one reinforcement metal cord comprising a plurality of cord coils, oriented in substantially circumferential direction, and disposed in axial side-by-side relation and extending from one axial end of said structure to the other at an angle almost of zero value relative to the equatorial plane of the tire, said at least one metal reinforcement cord being of a high-elongation, lang-lay type having a load-elongation diagram with a curvilinear knee-shaped portion which mutually connects two substantially rectilinear lengths of different inclinations relative to the axes of said diagram, said curvilinear knee-shaped portion having a center line ranging between an elongation value of 1.5% to 3%, wherein every said cord of said belt structure in a vulcanized but not inflated and not loaded tire being in a tensile preloading condition corresponding to a point of said diagram located within said curvilinear knee-shaped portion, wherein the only reinforcement belt structure between the tread band and the carcass is said annular reinforcement belt structure and all cord reinforcement of said belt structure is said metal cord coils which are high elongation metal cords.

17. The tire for two-wheeled vehicles of claim 16, wherein all cord coils of said annular reinforcement belt structure are high elongation metal cords.

18. The tire for two-wheeled vehicles of claim 16, wherein the carcass is rubberized fabric.

19. The tire for two-wheeled vehicles of claim 16, wherein the carcass comprises reinforcement cords oriented perpendicular to the equator.

* * * * *